(12) United States Patent
Chiba

(10) Patent No.: US 6,895,492 B2
(45) Date of Patent: May 17, 2005

(54) METHOD OF AND APPARATUS FOR PERFORMING TWO-LAYER ADDRESS TRANSLATION

(75) Inventor: Takuma Chiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 320 days.

(21) Appl. No.: 10/330,290

(22) Filed: Dec. 30, 2002

(65) Prior Publication Data

US 2004/0006678 A1 Jan. 8, 2004

(30) Foreign Application Priority Data

Jul. 5, 2002 (JP) ........................................ 2002-197954

(51) Int. Cl.[7] ............................................. G06F 12/00
(52) U.S. Cl. ...................................... 711/207; 711/210
(58) Field of Search ................................ 711/202, 203, 711/206, 210, 207

(56) References Cited

U.S. PATENT DOCUMENTS 4,695,950 A * 9/1987 Brandt et al. ............... 711/207
5,008,811 A * 4/1991 Scalzi et al. ................ 711/207
5,668,968 A * 9/1997 Wu ............................... 711/3
5,680,566 A * 10/1997 Peng et al. .................. 711/206
5,893,931 A * 4/1999 Peng et al. .................. 711/206
6,751,720 B2 * 6/2004 Barroso et al. ............. 711/210

FOREIGN PATENT DOCUMENTS

| JP | HEI 4-266140 A | 9/1992 |
| JP | HEI 5-46481 A | 2/1993 |
| JP | HEI 11-134256 A | 5/1999 |

\* cited by examiner

Primary Examiner—Matthew Kim
Assistant Examiner—Woo H Choi
(74) Attorney, Agent, or Firm—Staas & Halsey LLP

(57) ABSTRACT

A higher TLB that stores TLB data required for translating a virtual address into a physical address. A higher address translator performs address translation based on the TLB data according to an access. If address translation is not possible, the higher address translator requests a lower address translator to carry out the address translation. The lower address translator performs address translation based on a lower TLB. A shift register outputs a write prohibit signal to prohibit writing of the TLB data to the higher TLB, when write data that is the same as the write data has already been written in the higher TLB.

11 Claims, 6 Drawing Sheets

| RAM ADDRESS | TLB-TAG ⟨41:0⟩ | TLB-DATA ⟨29:0⟩ |
|---|---|---|
| 000 | 2aaa 8000 0000 | 0000 07f8 |
| 001 | 2aaa 8000 0000 | 0000 07f9 |
| ⋮ | ⋮ | ⋮ |
| 200 | 2aaa 8000 0004 | 0007 f800 |
| 201 | 2aaa 8000 0004 | 0007 f801 |
| ⋮ | ⋮ | ⋮ |

140(150)

METHOD OF AND APPARATUS FOR PERFORMING TWO-LAYER ADDRESS TRANSLATION

BACKGROUND OF THE INVENTION

1) Field of the Invention

The present invention relates to a method of and an apparatus for translating a virtual address into a physical address in a computer system of a virtual storage system.

2) Description of the Related Art

In a computer of a virtual storage system, a list called a page table is prepared to carry out address translation from a virtual address (VA) to a physical address (PA).

The address translation will be explained below with reference to FIG. 7. FIG. 7 shows a computer system of a virtual storage system. In this computer system, a CPU (central processing unit) 10 executes various operation instructions by making access to a main storage apparatus 20.

The main storage apparatus 20 stores a page table 30 for translating the virtual address VA into the physical address PA. The virtual address VA is an address specified in a computer program. On the other hand, the physical address PA is an address allocated to a physical memory unit in the main storage apparatus 20.

The page table 30 is a table that relates the virtual address VA to the physical address PA. In FIG. 7, the virtual address VA and the physical address PA are expressed in hexadecimal numbers like "aaaa 0000 0000 0000."

The virtual address VA has a 64-bit structure <63:0> (i.e., bits 0 to 63), as shown in FIG. 8A. In the virtual address VA <63:0>, VA <12:0> is an offset value having a 13-bit structure (hereinafter to be described as Off-SET <12:0>).

VA <21:13> is a RAM access address having a 9-bit structure (hereinafter to be described as RAM-ACCS-ADRS <8:0>). This RAM-ACCS-ADRS <8:0> is an address in a TLB (translation look-aside buffer: address translation buffer) 40 to be described later shown in FIG. 7, and corresponds to RAM-ACCS-ADRS <8:0> shown in FIG. 7.

Referring back to FIG. 8A, VA <63:22> is a tag having a 42-bit structure (hereinafter to be described as TLB-TAG <41:0>; refer to FIG. 9A), and this is used as an index in the TLB 40. Further, TLB-TAG <41:0> shown in FIG. 8A corresponds to TLB-TAG <41:0> in the TLB 40.

On the other hand, the physical address PA in the page table 30 shown in FIG. 7 has a 43-bit structure <42:0>, as shown in FIG. 8B. In this physical address PA <42:0>, PA <12:0> is an offset value having a 13-bit structure (hereinafter to be described as Off-SET <12:0>), and this is equivalent to Off-SET <12:0> shown in FIG. 8A. PA <42:13> is data corresponding to the physical address (hereinafter to be described as TLB-DATA <29:0>).

When there is no TLB 40, in principle, an instruction processing section (not shown) of the CPU 10 must make access to the main storage apparatus 20 and translate the virtual address VA into the physical address PA with reference to the page table 30, by using the virtual address VA, each time when it is necessary to carry out the address translation.

However, when the CPU 10 makes access to the main storage apparatus 20 and refers to the page address 30 at each time of the address translation, much processing time is required for the address translation. This has a problem that the processing speed is lowered.

In order to avoid this problem, conventionally, the TLB (address translation buffer) 40 has been provided in a not shown RAM (random access memory) that can be accessed at a high speed, within the CPU 10.

This TLB 40 has 512 entries, for example. Assume that, in the TLB 40, values are expressed in hexadecimal numbers such as "0000" and "2aaa 8000 0000". In each entry of the TLB 40, there are stored RAM-ACCS-ADRS <8:0> that shows an address (entry) in the RAM, TLB-TAG <41:0> (tag) as an index, and TLB-DATA <29:0> (data) corresponding to the physical address, as TLB data respectively.

TLB-TAG <41:0> in the TLB 40 corresponds to TLB-TAG <41:0> in the virtual address VA. TLB-DATA <29:0> in the TLB 40 corresponds to TLB-DATA <29:0> in the physical address PA.

In the above structure, in order to read an instruction code from the main storage apparatus 20, the instruction processing section of the CPU 10 refers to the TLB 40, by using RAM-ACCS-ADRS <8:0> included in the virtual address VA corresponding to this instruction code as a RAM access address.

Based on this, TLB-TAG <41:0> and TLB-DATA <29:0> stored at the address shown by RAM-ACCS-ADRS <8:0> (refer to FIG. 8A) are read out.

The instruction processing section compares the above TLB-TAG <41:0> with TLB-TAG <41:0> included in the virtual address VA.

When both TLB-TAG <41:0> coincide with each other, the instruction processing section combines the above TLB-DATA <29:0> with Off-SET <12:0> included in the virtual address VA, as HIT (TLB hit), and generates the physical address PA.

The instruction processing section reads the instruction code from the main storage apparatus 20 based on the physical address PA.

The instruction processing section executes the instruction based on the instruction code. At the time of storing a result of the execution into the main storage apparatus 20, the instruction processing section refers to the TLB 40 again, and executes the address translation processing to translate the virtual address VA into the physical address PA.

When TLB-TAG <41:0> of the TLB 40 does not coincide with TLB-TAG <41:0> included in the virtual address VA, (MISS (TLB error), the instruction processing section refers to the page table 30, and translates the virtual address VA into the physical address PA.

When the TLB error has occurred, RAM-ACCS-ADRS <8:0> and TLB-TAG <41:0> included in the virtual address VA, and TLB-DATA <29:0> included in the physical address PA, are stored as TLB data in a pair, into the TLB 40.

Thereafter, the virtual address VA is translated into the physical address PA based on the TLB 40. When there is no space in the TLB 40, the data is overwritten onto an entry where the oldest TLB data is stored.

At this time, conventionally, a two-layer address translation apparatus is used to achieve a high-speed address translation using the TLB in two layers of a lower layer and a higher layer. FIG. 10 is a block diagram that shows a structure of a conventional two-layer address translation apparatus 50.

The two-layer address translation apparatus 50 shown in FIG. 10 has a two-layer structure including a lower address translator 51 and a higher address translator 52. Actually, the two-layer address translation apparatus 50 constitutes a part of the processor like the CPU. The lower address translator 51 translates the virtual address into the physical address by using a lower TLB (not shown) having the same structure as that of the TLB 40 (refer to FIG. 1).

The higher address translator 52 stores a part of the TLB data out of the TLB data stored in the lower TLB of the lower address translator 51. The higher address translator 52 can carry out the processing at a higher speed than the lower address translator 51.

uTLB_GO (a higher access request signal) is a signal that shows that the virtual address VA has been output to the higher address translator 52, that is, an access to the higher address translator 52 has been requested.

When UTLB_GO (a higher access request signal) and the virtual address VA have been input, the higher address translator 52 searches the higher TLB by using TLB-TAG <41:0> included in the virtual address VA. When the searching HITs (higher TLB hit), the higher address translator 52 translates the virtual address VA into the physical address PA by using the higher TLB.

When the searching of the higher TLB has not hit, that is, when the searching has been MISS (higher TLB error), the higher address translator 52 outputs mTLB_GO (a lower access request signal) to make the lower address translator 51 carry out the address translation.

When mTLB_GO (a lower access request signal) and the virtual address VA have been input, the lower address translator 51 searches the lower TLB, and translates the virtual address VA into PA (the physical address).

When the lower address translator 51 has been able to translate the virtual address VA into the physical address PA, that is, when the lower access has been HIT (lower TLB hit), the lower address translator 51 outputs a write enable signal WE and a write data WD to the higher address translator 52.

The write data WD is constructed of a virtual address VA <63:13> and a physical address PA <42:13> corresponding to the HIT (lower TLB hit), as shown in FIG. 11. On the other hand, the write enable signal WE is a signal for instructing the writing of the write data WD to the higher TLB of the higher address translator 52.

When the lower address translator 51 has not been able to translate the virtual address VA into the physical address PA, that is, when the lower access has been MISS (lower TLB error), the address translation is executed based on the page table (not shown).

In the above structure, when the virtual address VA and uTLB_GO (a higher access request signal) shown in FIG. 10 have been input to the higher address translator 52, the higher address translator 52 compares VA <63:13> with the virtual address VA <63:13> stored in the higher TLB (refer to FIG. 9A).

When both VA <63:13> coincide with each other, HIT (higher TLB hit) occurs. The higher address translator 52 combines VA <12:0> and TLB-DATA <29:0> stored in TLB together, and outputs PA <42:0> (physical address) shown in FIG. 8B.

Based on the above PA (physical address), the instruction code is read from the main storage apparatus (not shown).

When VA <63:13> does not coincide with each other, MISS (higher TLB error) occurs. Based on this, the higher address translator 52 outputs mTLB_GO (a lower access request signal) to the lower address translator 51. Further, the virtual address VA is input to the lower address translator 51.

The lower address translator 51 searches the lower TLB based on the virtual address VA, in a similar manner to that of the higher address translator 52.

When it has been possible to translate the virtual address VA into the physical address PA, that is, when the access has been HIT (lower TLB hit), the lower address translator 51 outputs the write enable signal WE and the write data WD (the virtual address VA <63:13> and the physical address PA <42:13>) shown in FIG. 11 to the higher address translator 52.

The higher address translator 52 stores the virtual address VA <63:13> and the physical address PA <42:13> obtained from the write data WD to the higher TLB. Thereafter, the higher address translator 52 translates the virtual address VA into the physical address PA.

According to the conventional two-layer address translation apparatus 50, there have been the following problems. When the same virtual address VA and uTLB_GO (a higher access request signal) have been input to the higher address translator 52 as MISS (higher TLB error) continuously by two or more times, the same write data WD (the virtual address VA <63:13> and the physical address PA <42:13>) are stored in the higher TLB in a duplicate state. As a result, a multi-hit has occurred.

In other words, at the first time, the virtual address VA and uTLB_GO (a higher access request signal) are input to the higher address translator 52. Because of MISS (higher TLB error), mTLB_GO (a lower access request signal) and the virtual address VA are input to the lower address translator 51. At this time, the lower address translator 51 searches the lower TLB, and HIT (lower TLB hit) occurs.

As a result, the lower address translator 51 outputs the write data WD (the virtual address VA <63:13> and the physical address PA <42:13>) to the higher address translator 52, and stores the data into the higher TLB.

However, when the virtual address VA and uTLB_GO (a higher access request signal) that are the same as the first-time virtual address VA are input at a second time, during a period from when the virtual address VA and uTLB_GO (a higher access request signal) have been input to the higher address translator 52 at the first time till when the write data WD has been input to the higher address translator 52 (before the write data WD is written to the higher TLB), MISS (higher TLB error) occurs because of two continuous errors.

Consequently, mTLB_GO (a lower access request signal) and the virtual address VA are input to the lower address transistor 51. At this time, the lower address translator 51 searches the lower TLB, and HIT (lower TLB hit) occurs again as two continuous HIT.

Next, the lower address translator 51 outputs the second-time write data WD (the virtual address VA <63:13> and the physical address PA <42:13>) that are the same as the first-time data to the higher address translator 52, and stores the data into the higher TLB.

At this time, the first-time write data WD and the second-time write data WD that are the same write data WD are stored in the higher TLB in duplicate. When the virtual address VA and uTLB_GO (a higher access request signal) are input to the higher address translator 52 at a third time in this state, a multi-hit occurs, which becomes an error.

SUMMARY OF THE INVENTION

It is an object of the present invention to provide a method and an apparatus that can prevent a double writing from a lower layer to a higher layer and prevent a multi-hit of address translation in the higher layer.

The two-layer address translation apparatus according to one aspect of the present invention includes a higher address translation buffer that stores address translation data for translating a virtual address into a physical address; a higher control unit that translates a virtual address into a physical address based on the address translation data in the higher address translation buffer according to an access, and requests a latter stage to control the address translation when it is not possible to carry out the translation; a lower control unit that translates the virtual address into the physical address according to the request for address translation from the higher control unit; a write control unit that writes the address translation data that has been used for address translation into the higher address translation buffer; and a write prohibiting unit that refers to record information relating to the writing of address translation data into the higher address translation buffer, and prohibits the writing of the address translation data into the higher address translation buffer when address translation data that is the same as the address translation data has already been written in the higher address translation buffer.

The two-layer address translation method according to another aspect of the present invention includes a higher control step of translating a virtual address into a physical address based address translation data stored in a higher address translation buffer, the address translation data being data for translating a virtual address into a physical address, according to an access, and requesting a latter stage to control the address translation when it is not possible to carry out the translation; a lower control step of translating the virtual address into the physical address according to the request for address translation at the higher control step; a write control step of writing the address translation data that has been used for address translation into the higher address translation buffer; and a write prohibiting step of referring to record information relating to the writing of address translation data into the higher address translation buffer, and prohibiting the writing of the address translation data to the higher address translation buffer when address translation data that is the same as the address translation data has already been written in the higher address translation buffer.

According to the method and apparatus of the present invention, record information relating to the writing of address translation data into the higher address translation buffer is referred to. When address translation data that is the same as the address translation data has already been written in the higher address translation buffer, the writing of the address translation data to the higher address translation buffer is prohibited.

These and other objects, features and advantages of the present invention are specifically set forth in or will become apparent from the following detailed descriptions of the invention when read in conjunction with the accompanying drawings.

DETAILED DESCRIPTIONS

An exemplary embodiment of the two-layer address translation apparatus and the two-layer address translation method relating to the present invention will be explained in detail below with reference to the accompanying drawings.

Figure 1:
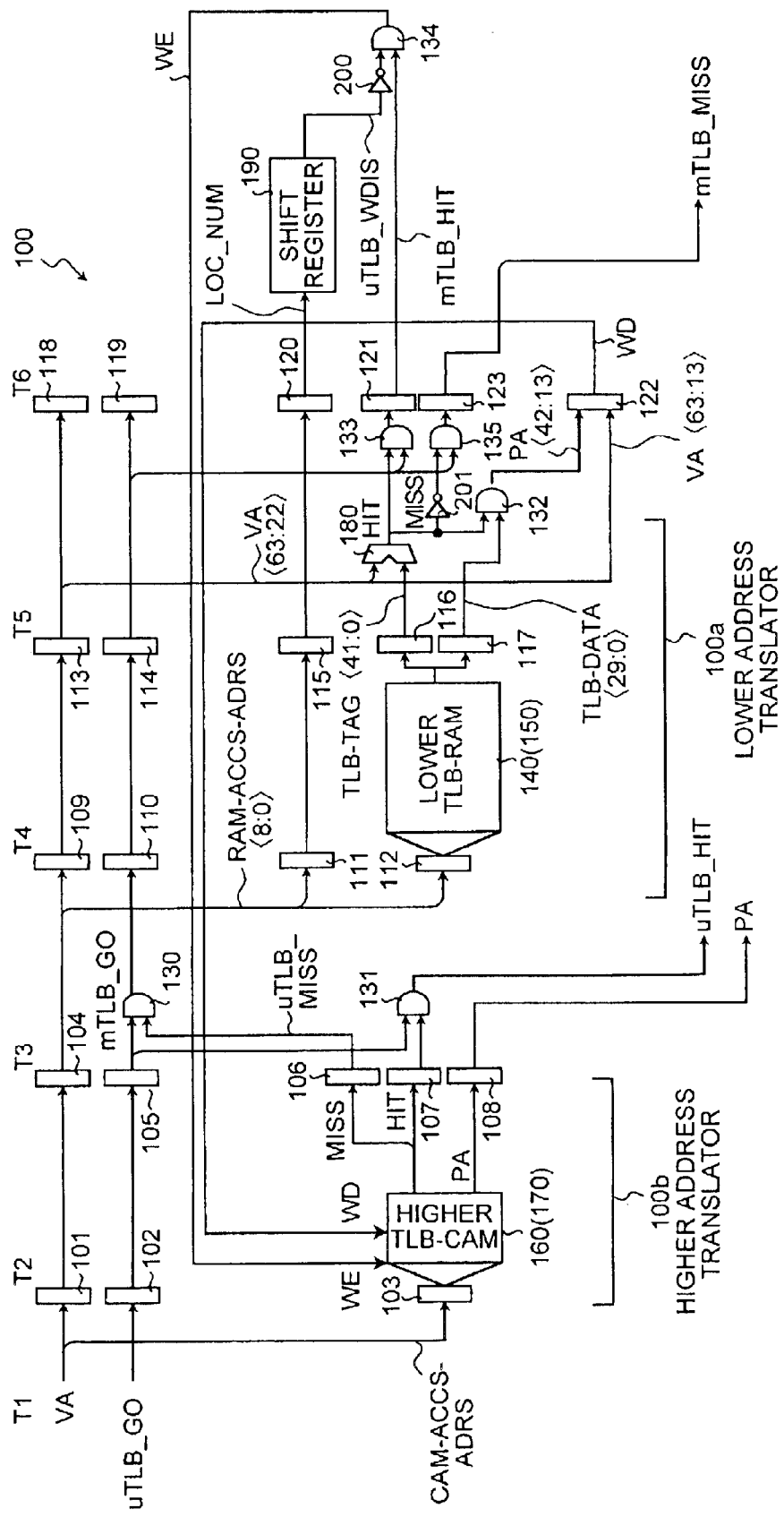
FIG. 1 is a block diagram that shows a structure of a two-layer address translation apparatus according to a first embodiment of the present invention.

FIG. 1 is a block diagram of a two-layer address translation apparatus according to an embodiment of the present invention. FIG. 1 shows a two-layer address translation apparatus 100 that carries out a high-speed address translation from a virtual address into a physical address in a computer system of a virtual storage system. Actually, the two-layer address translation apparatus 100 constitutes a part of the processor such as a CPU.

As shown in FIG. 1, the two-layer address translation apparatus 100 has a two-layer structure including a lower address translator 100a and a higher address translator 100b. The lower address translator 100a translates a virtual address VA (see FIG. 8A) into a physical address PA (see FIG. 8B) by using a lower TLB 150. The lower TLB 150 will be described in detail later.

The higher address translator 100b stores a part of TLB data out of TLB data stored in the lower TLB 150 of the lower address translator 100a. The higher address translator 100b can carry out the processing at a higher speed than the lower address translator 100a.

uTLB_GO (a higher access request signal) is a signal that shows that the virtual address VA has been valid, that is, an access to the higher address translator 100b has been requested.

When uTLB_GO (a higher access request signal) and the virtual address VA have been input, the higher address translator 100b searches a higher TLB 170 to be described later by using a virtual address VA <63:13>. When the searching hits as uTLB_HIT (higher TLB hit), the higher address translator 100b translates the virtual address VA into the physical address PA by using the higher TLB 170.

When the searching of the higher TLB 170 has not hit, that is, when the searching has been uTLB_MISS (higher TLB error), the higher address translator 100b outputs mTLB_GO (a lower access request signal) to make the lower address translator 100a carry out the address translation, from an AND circuit 130.

When mTLB_GO (a lower access request signal) and the virtual address VA have been input, the lower address translator 100a searches the lower TLB 150 to be described later, and translates the virtual address VA into the physical address PA.

When the lower address translator 100a has been able to translate the virtual address VA into the physical address PA, that is, when the lower access has been mTLB_HIT (lower TLB hit), the lower address translator 100a outputs a write enable signal WE and a write data WD (refer to FIG. 11) to the higher address translator 100b.

Figure 11:
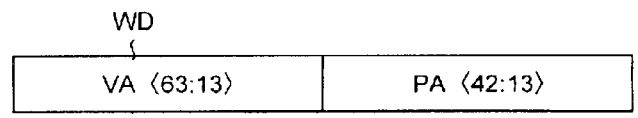
FIG. 11 is a diagram that shows a data structure of write data WD shown in FIG. 1 and FIG. 10.

The write data WD is constructed of a virtual address VA <63:13> and a physical address PA <42:13> corresponding to the mTLB_HIT (lower TLB hit), as shown in FIG. 11. On the other hand, the write enable signal WE is a signal for instructing the writing of the write data WD to the higher TLB 170 of the higher address translator 100b.

When the lower address translator 100a has not been able to translate the virtual address VA into the physical address PA, that is, when the lower access has been mTLB_MISS (lower TLB error), the address translation data is referred to a page table not shown.

The two-layer address translation apparatus 100 is provided with latch circuits 101 to 123, and various kinds of data and signals are shifted from the left to the right at timings T1 to T6. The latch circuits 101 to 103 correspond to the timing T2, and the latch circuits 104 to 108 correspond to the timing T3.

The latch circuits 109 to 112 correspond to the timing T4. The latch circuits 113 to 117 correspond to the timing T5. The latch circuits 118 to 123 correspond to the timing T6.

Figures 2, 3:
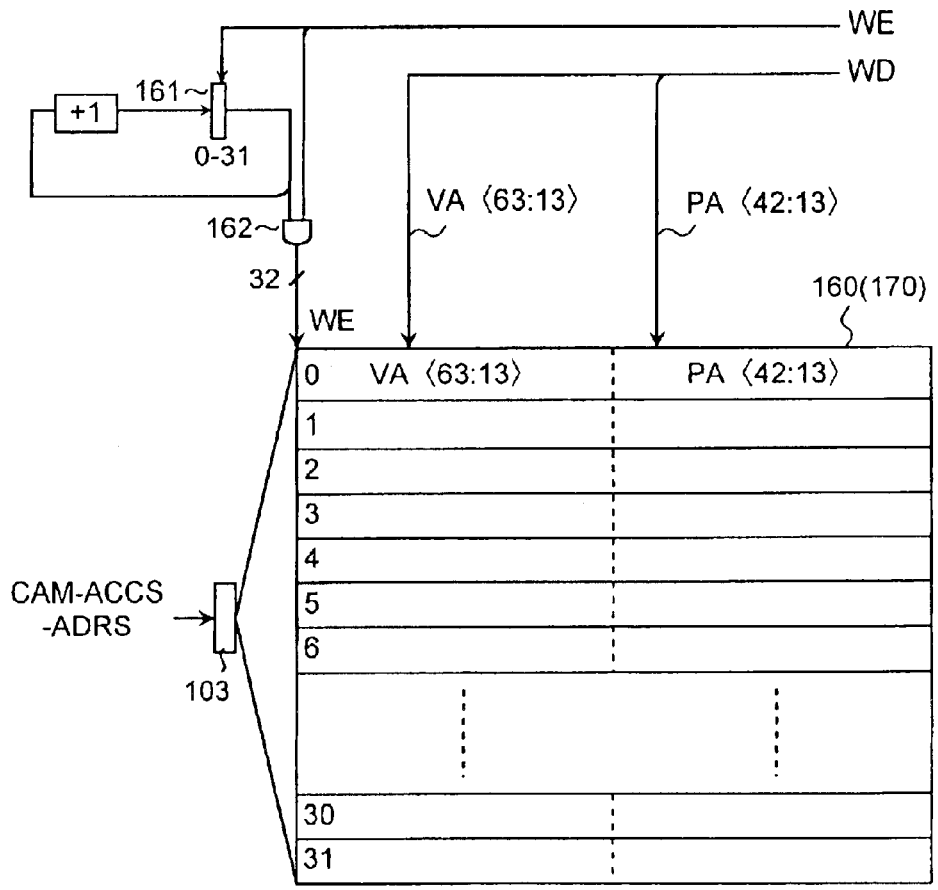
FIG. 2 is a diagram that shows a structure of a lower TLB-RAM 140 shown in FIG. 1.
FIG. 3 is a diagram that shows a structure of a higher TLB-CAM 160 shown in FIG. 1.

A lower TLB-RAM 140 is provided with the lower TLB 150. This lower TLB 150 has a plurality of entries (such as 1024 entries) for example, as shown in FIG. 2. In the lower TLB 150, each value is expressed in a hexadecimal number.

In the lower TLB-RAM 140, TLB-TAG <41:0> (tag) as an index, and TLB-DATA <29:0> (data) corresponding to the physical address are stored.

Further, TLB-TAG <41:0> in the lower TLB 150 corresponds to TLB-TAG <41:0> in the virtual address VA. TLB-DATA <29:0> in the lower TLB 150 corresponds to TLB-DATA <29:0> in the physical address PA.

Referring back to FIG. 1, a higher TLB-CAM (TLB-content addressable memory) 160 is provided with a higher TLB 170. This higher TLB 170 has 32 (0 to 31) entries as shown in FIG. 3. It is possible to make access to this higher TLB-CAM 160 at a higher speed than to the lower TLB-RAM 140.

The higher TLB 170 stores a part of the higher TLB data stored in the lower TLB 150 (refer to FIG. 2), as higher TLB data.

Specifically, a virtual address VA <63:13> and a physical address PA <42:13> are stored into the entries of the higher TLB 170, based on write data WD and a write enable signal WE that are input by the lower address translator 100a (refer to FIG. 1) at the time of mTLB_HIT (lower TLB hit).

The entry into which the write data WD is stored is assigned by an AND circuit 162 that takes AND of an output of a counter 161 that is counted up each time of storage and the write enable signal WE. The higher TLB-CAM 160 is controlled with a FIFO (first-in and first-out).

The latch circuit 103 latches CAM-ACCS-ADRS (CAM access address) that is included in the virtual address VA. This CAM-ACCS-ADRS (CAM access address) is the virtual address VA <63:13>, and this is used to search the higher TLB 170.

Referring back to FIG. 1, the latch circuit 116 reads TLB-TAG <41:0> corresponding to RAM-ACCS-ADRS <8:0> (RAM access address) from the lower TLB 150, and latches this.

The latch circuit 117 reads TLB-DATA <29:0> corresponding to RAM-ACCS-ADRS <8:0> (RAM access address) from the lower TLB 150, and latches this.

A comparator circuit 180 compares TLB-TAG <41:0> from the latch circuit 116 with VA <63:22> from the latch circuit 113. When both coincide with each other, HIT (lower TLB hit) occurs. When HIT (lower TLB hit) has been input, an AND circuit 132 outputs a physical address PA <42:13> (equivalent to TLB-DATA <29:0>).

The latch circuit 122 latches the virtual address VA <63:13> and the physical address PA <42:13> as write data WD, and outputs this write data WD to the higher TLB 170.

An AND circuit 133 takes AND of HIT (lower TLB hit) and mTLB_GO (a lower access request signal) latched by the latch circuit 114. When the AND circuit 133 has satisfied the AND condition, the latch circuit 121 sets mTLB_HIT (lower TLB hit).

An AND circuit 135 takes AND of an output (MISS (lower TLB error) of a NOT circuit 201 and mTLB_GO (a lower access request signal) latched by the latch circuit 114. When the AND circuit 135 has satisfied the AND condition, the latch circuit 123 sets mTLB_MISS (lower TLB error).

Figure 4:
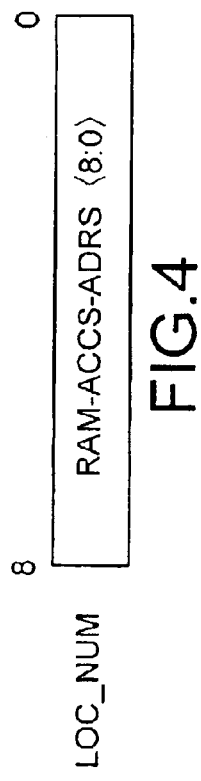
FIG. 4 is a diagram that shows a data structure of LOC_NUM shown in FIG. 1.
Figure 8A:
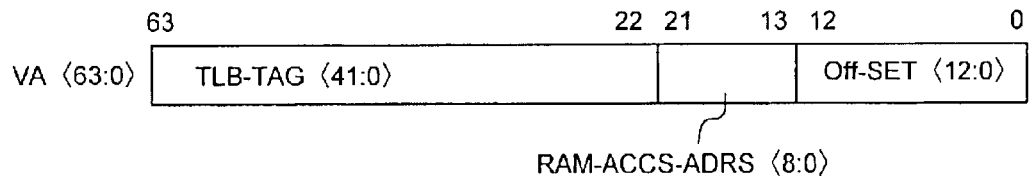
FIGS. 8A and 8B are diagrams that show data structures of a virtual address VA and a physical address PA respectively.
Figure 8B:
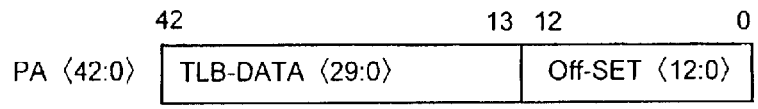
Figure 9A:
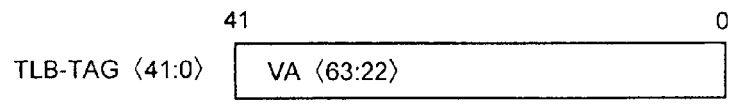
FIGS. 9A and 9B are diagrams that show data structures of TLB-TAG and TLB-DATA respectively.
Figure 9B:
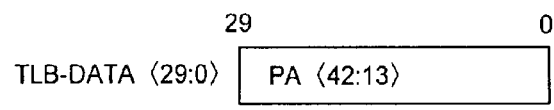
Figure 10:
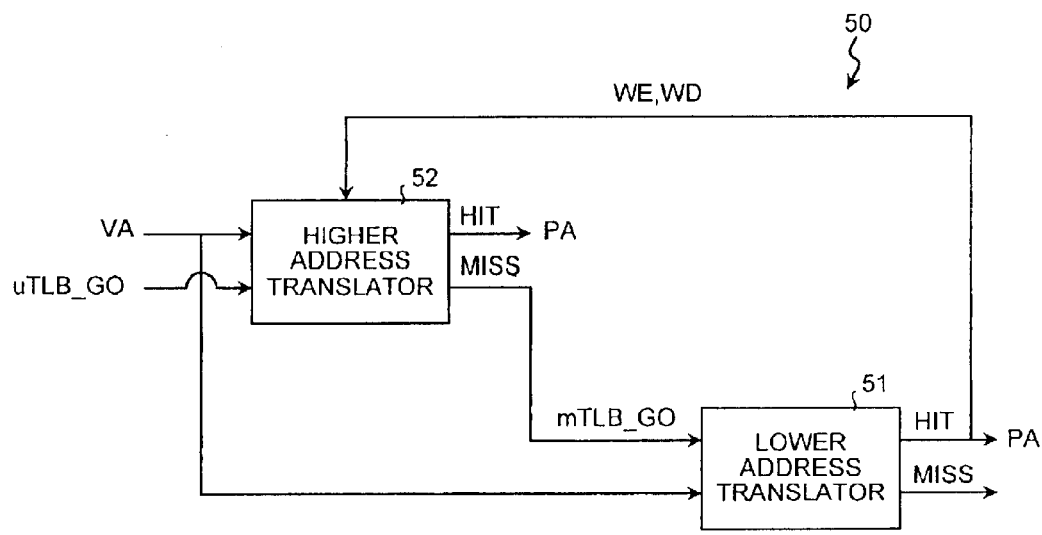
FIG. 10 is a block diagram that shows a structure of a conventional two-layer address translation apparatus 50.

The latch circuit 111, the latch circuit 115, and the latch circuit 120 latch respectively RAM-ACCS-ADRS <8:0> (refer to FIG. 8A). The latch circuit 120 latches RAM-ACCS-ADRS <8:0> as LOC_NUM (position data) at timing T6 as shown in FIG. 4.

LOC_NUM (position data) is data that shows a position (address) at which the lower TLB data to be searched for in the lower TLB 150 of the current timing has been stored.

A shift register 190 is provided in order to prevent a multi-hit due to the transfer of a double writing of the same write data WD from the lower address translator 100a to the higher address translator 100b.

This shift register 190 has a function of storing LOC_NUM (position data) of the past four timings retroactively from the current timing, and a function of outputting a write prohibit signal uTLB_WDIS of "1" when the past LOC_NUM (position data) has coincided with LOC_NUM (position data) of the current timing.

The write prohibit signal uTLB_WDIS of "1" is a signal for prohibiting the writing of the write data WD from the lower address translator 100a to the higher address translator 100b.

Figure 5:
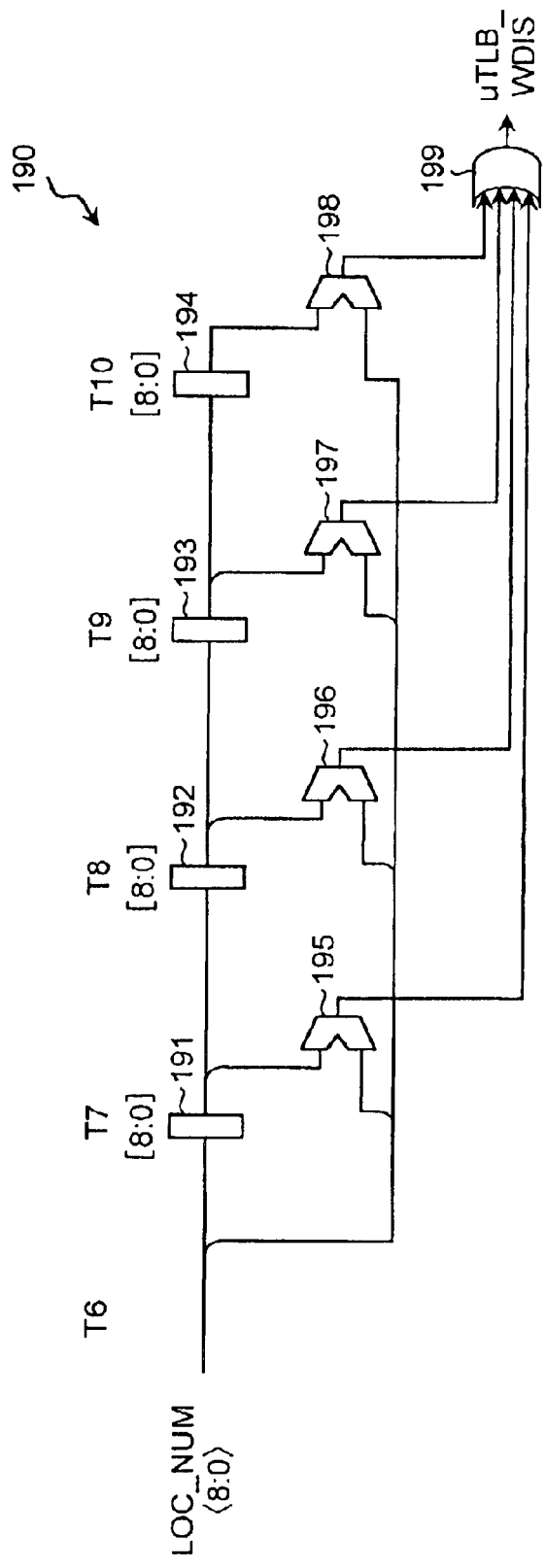
FIG. 5 is a diagram that shows a structure of a shift register 190 shown in FIG. 1.

The shift register 190 includes registers 191 to 194 of four-stage shift structure, corresponding comparator circuits 195 to 198 and an OR circuit 199 respectively, as shown in FIG. 5.

The registers 191 to 194 are 9-bit registers corresponding to LOC_NUM (position data). LOC_NUM (position data) of the past four timings are stored in these registers 191 to 194. LOC_NUM (position data) is shifted from the left to the right in the drawing at each timing.

The comparator circuit 195 compares LOC_NUM (position data) of the current timing with LOC_NUM (position data) of the past one timing that is stored in the register 191. When both data coincide with each other, the comparator circuit 195 outputs a signal 1.

The comparator circuit 196 compares LOC_NUM (position data) of the current timing with LOC_NUM (position data) of the past two timings that are stored in the register 192. When both data coincide with each other, the comparator circuit 196 outputs a signal 1.

The comparator circuit 197 compares LOC_NUM (position data) of the current timing with LOC_NUM (position data) of the past three timings that are stored in the register 193. When both data coincide with each other, the comparator circuit 197 outputs a signal 1.

The comparator circuit 198 compares LOC_NUM (position data) of the current timing with LOC_NUM (position data) of the past four timings that are stored in the register 194. When both data coincide with each other, the comparator circuit 198 outputs a signal 1.

The OR circuit 199 takes OR of outputs from the comparator circuits 195 to 198. When a signal 1 has been input from any one of the comparator circuits, the OR circuit 199 outputs the write prohibit signal uTLB_WDIS of "1".

Referring back to FIG. 1, a NOT circuit 200 inverts the write prohibit signal uTLB_WDIS (from 1 to 0, or from 0 to 1). An AND circuit 134 takes AND of mTLB_HIT (lower TLB hit) and an output signal of the NOT circuit 200, and outputs a write enable signal WE.

The operation of the two-layer address translation apparatus shown in FIG. 1 will be explained with reference to a time chart shown in FIG. 6. The operation such that a double writing of the same write data WD from the lower address translator 100a to the higher address translator 100b is prohibited when MISS (higher TLB error) occurred twice continuously in the higher address translator 100b will be explained.

Figure 6:
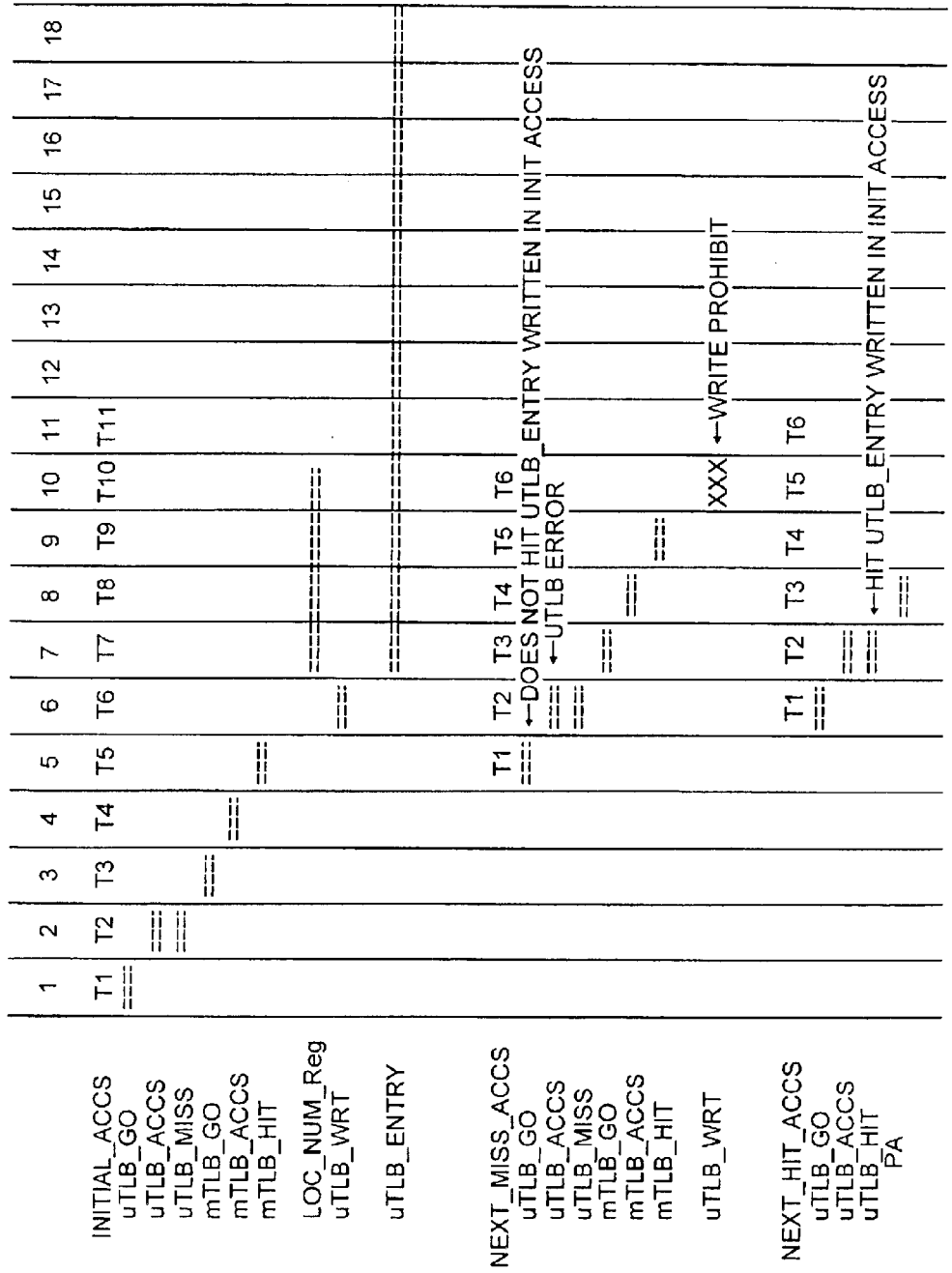
FIG. 6 is a time chart that explains the operation of the two-layer address translation apparatus according to the first embodiment.
Figure 7:
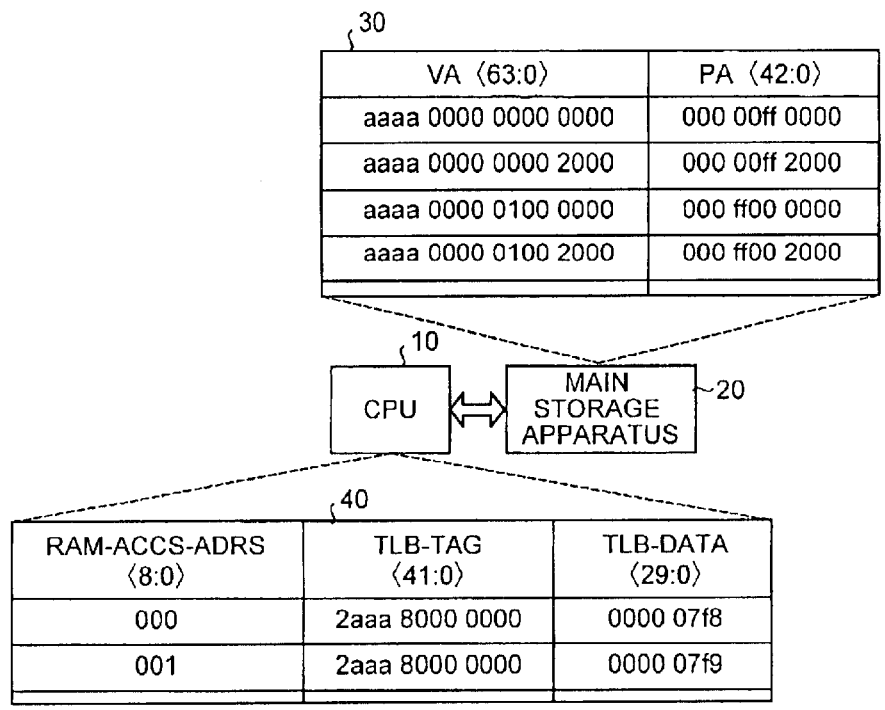
FIG. 7 is a block diagram that explains a conventional address translation.

In FIG. 6, "1" to "18" at the top stage show total timings. INITIAL_ACCS (first access, higher TLB hit) shows a first access to the higher address translator 100b. NEXT_MISS_ACCS (second access, higher TLB error) shows a second access to the higher address translator 100b.

NEXT_HIT_ACCS (third access, higher TLB hit) shows a third access to the higher address translator 100b. In the first to third accesses, the same virtual address VA is used.

At a timing T1 (total timing "1") of INITIAL_ACCS shown in FIG. 6, uTLB_GO (higher access request signal) and the virtual address VA are input to the two-layer address translation apparatus 100.

At a timing T2 of INITIAL_ACCS, access (uTLB_ACCS) is made to the higher TLB 170, and a result of searching is MISS (uTLB_MISS).

In other words, at the timing T2 (uTLB_ACCS), the latch circuit 101 latches the virtual address VA, and the latch circuit 103 latches CAM_ACCS_ADRS (CAM access address). The latch circuit 102 latches uTLB_GO (higher access request signal).

In the higher TLB 170 shown in FIG. 3, the stored virtual address VA <63:13> is compared with CAM_ACCS_ADRS (CAM access address) (VA <63:13> (refer to FIG. 8A)). At this time, these addresses do not coincide with each other, and MISS (higher TLB error) occurs.

At a timing T3 of INITIAL_ACCS shown in FIG. 6, mTLB_GO (a lower access request signal) is output. In other words, the latch circuit 104 latches the virtual address VA, and the latch circuit 105 latches uTLB_GO (higher access request signal).

The latch circuit 106 latches the signal of MISS (lower TLB error), and the AND circuit 130 outputs mTLB_GO (a lower access request signal).

At a timing T4 of INITIAL_ACCS, access (mTLB_ACCS) is made to the lower TLB 150. In other words, the latch circuit 109 latches the virtual address VA, and the latch circuit 110 latches mTLB_GO (a lower access request signal).

The latch circuit 111 and the latch circuit 112 latch RAM-ACCS-ADRS <8:0> (RAM access address) that is included in the virtual address VA.

At a timing T5 of INITIAL_ACCS, a result of the searching becomes HIT (mTLB_HIT). In other words, at the timing T4, the lower TLB 150 is searched by using RAM-ACCS-ADRS <8:0> (RAM access address) that has been latched by the latch circuit 112. The latch circuit 116 latches TLB-TAG <41:0> corresponding to this RAM-ACCS-ADRS <8:0> (RAM access address).

The lower TLB 150 is searched by using RAM-ACCS-ADRS <8:0> (RAM access address). The latch circuit 117 latches TLB-DATA <29:0> corresponding to this RAM-ACCS-ADRS <8:0> (RAM access address).

The comparator circuit 180 compares VA <63:22> from the latch circuit 113 with TLB-TAG <41:0> from the latch circuit 116. When both data coincide with each other, the comparator circuit 180 generates HIT (lower TLB hit). The AND circuit 133 takes AND of this HIT (lower TLB hit) and mTLB_GO (a lower access request signal) latched by the latch circuit 114.

At the timing same as the timing T5 (total timing "5") of INITIAL_ACCS, a second access (NEXT_MISS_ACCS) to the higher address translator 100b is carried out.

In other words, at the timing T1 (total timing "5") of NEXT_MISS_ACCS, uTLB_GO (a higher access request signal) and the virtual address VA are output.

At the timing T2 (total timing "6") of NEXT_MISS_ACCS, access (uTLB_ACCS) is made to the higher TLB 170. At this timing, the write data WD from the lower address translator 100a has not been written to the higher TLB 170. Therefore, a result of the searching becomes MISS (uTLB_MISS) again.

In other words, at the timing T2 (uTLB_ACCS), the latch circuit 101 latches the virtual address VA, and the latch circuit 103 latches CAM_ACCS_ADRS (CAM access address), in the same manner as INITIAL_ACCS described above. The latch circuit 102 latches uTLB_GO (higher access request signal).

In the higher TLB 170, the stored virtual address VA <63:13> is compared with CAM_ACCS_ADRS (CAM access address) (VA <63:13> (refer to FIG. 8A)). At this time, these addresses do not coincide with each other, and MISS (higher TLB error) occurs.

On the other hand, at the timing T6 (uTLB_WRT) of INITIAL_ACCS, the latch circuit 122 latches the virtual address VA <63:13> and the physical address PA <42:13> as the write data WD.

At the timing same as the timing T6 of INITIAL_ACCS and the timing T2 of NEXT_MISS_ACCS, a third access (NEXT_HIT_ACCS) to the higher address translator 100b is carried out.

In other words, at the timing T1 (total timing "6") of NEXT_HIT_ACCS, uTLB_GO (a higher access request signal) and the virtual address VA are output.

At the timing T6 of INITIAL_ACCS, each of the comparator circuits 195 to 198 of the shift register 190 shown in FIG. 5 compares LOC_NUM (position data) of the current timing with LOC_NUM (position data) of the past four timings stored in the registers 191 to 194 respectively. In this case, all results of the comparisons are non-coincidence. Therefore, the comparator circuits 195 to 198 output a signal 0.

The OR circuit 199 outputs a write prohibit signal uTLB_WDIS of "0". This write prohibit signal uTLB_WDIS of "0" is inverted by the NOT circuit 200. The AND circuit 134 outputs a write enable signal WE of "1" to the higher TLB 170.

At the timing T6 of INITIAL_ACCS, the latch circuit 122 outputs the write data WD to the higher TLB 170. The higher TLB 170 inputs the write enable signal WE of "1". Based on this, the write data WD (the virtual address VA <63:13> and the physical address PA <42:13>) are stored into entries assigned by the counter 161 and the AND circuit 162 respectively. At a timing T7 and after, the write data WD stored in the entries become valid.

At the timing T3 of NEXT_MISS_ACCS, mTLB_GO (a lower access request signal) is output. In other words, the latch circuit 104 shown in FIG. 1 latches the virtual address VA, and the latch circuit 105 latches uTLB_GO (higher access request signal).

The latch circuit 106 latches the signal of MISS (lower TLB error), and the AND circuit 130 outputs mTLB_GO (a lower access request signal).

At the timing T2 (total timing "7") of NEXT_HIT_ACCS, access (uTLB_ACCS) is made to the higher TLB 170. A result of the searching becomes HIT (uTLB_HIT).

In other words, at the timing T2 (uTLB_ACCS), the latch circuit 101 latches the virtual address VA, and the latch circuit 103 latches CAM_ACCS_ADRS (CAM access address). The latch circuit 102 latches uTLB_GO (higher access request signal).

In the higher TLB 170, the virtual address VA <63:13> stored in the entry is compared with CAM_ACCS_ADRS (CAM access address) (VA <63:13>).

At the timing T2 (uTLB_ACCS), a result of the comparison in the higher TLB 170 becomes a coincidence, and HIT (higher TLB hit) occurs.

At a timing T7–T10 of INITIAL_ACCS, LOC_NUM (position data) stored in the registers 191 to 194 of the shift register 190 shown in FIG. 5 are shifted from the left to the right.

At the timing T4 (total timing "8") of NEXT_MISS_ACCS, access (mTLB_ACCS) is made to the lower TLB 150. In other words, the latch circuit 109 latches the virtual address VA, and the latch circuit 110 latches mTLB_GO (a lower access request signal).

The latch circuit 111 and the latch circuit 112 latch RAM-ACCS-ADRS <8:0> (RAM access address) that is included in the virtual address VA.

At the timing T3 of NEXT_HIT_ACCS, the latch circuit 108 outputs the physical address PA.

At the timing T4 of NEXT_MISS_ACCS, a result of the searching becomes HIT (mTLB_HIT). In other words, at the timing T4, the lower TLB 150 is searched by using RAM-ACCS-ADRS <8:0> (RAM access address) that has been latched by the latch circuit 112. The latch circuit 116 latches TLB-TAG <41:0> corresponding to this RAM-ACCS-ADRS <8:0> (RAM access address).

The lower TLB 150 is searched by using RAM-ACCS-ADRS <8:0> (RAM access address). The latch circuit 117 latches TLB-DATA <29:0> corresponding to this RAM-ACCS-ADRS <8:0> (RAM access address).

The comparator circuit 180 compares VA <63:22> from the latch circuit 113 with TLB-TAG <41:0> from the latch circuit 116. When both data coincide with each other, the comparator circuit 180 generates HIT (lower TLB hit). The AND circuit 133 takes AND of this HIT (lower TLB hit) and mTLB_GO (a lower access request signal) latched by the latch circuit 114.

At this time, LOC_NUM (position data) of HIT (mTLB_HIT) in the lower TLB 150 at four timings before is stored in the register 194.

Each of the comparator circuits 195 to 198 compares LOC_NUM (position data) of the current timing (NEXT_MISS_ACCS) with LOC_NUM (position data) of the past four timings stored in the registers 191 to 194 respectively. In this case, a result of the comparison by the comparator circuit 198 is coincidence. Therefore, the comparator circuit 198 outputs a signal 1.

The OR circuit 199 outputs a write prohibit signal uTLB_WDIS of "1". This write prohibit signal uTLB_WDIS of "1" is inverted by the NOT circuit 200. The AND circuit 134 outputs a write enable signal WE of "0" (write prohibit signal) to the higher TLB 170.

Based on this, at the timing T6 of NEXT_MISS_ACCS, a double writing of the same write data WD to the higher TLB 170 is prohibited.

As shown in FIG. 6, the shift register 190 holds LOC_NUM (position data) of the past four timings. Therefore, when there has been a second access to the higher TLB_CAM 160 within four timings since the first access (uTLB_ACCS: total timing "2") to the higher TLB_CAM 160, a double writing of the same write data WD to the higher TLB 170 is prohibited. As a result, it is possible to prevent a multi-hit.

When there occurs a third access to the higher TLB_CAM 160 after five timings since the first access (uTLB_ACCS: total timing "2") to the higher TLB_CAM 160, HIT (higher TLB hit) occurs in the higher TLB 170. As a result, a normal operation is carried out.

As explained above, according to the present embodiment, the shift register 190 checks the past record relating to the writing of the write data WD to the higher TLB 170. When the data same as the write data WD has already been written in the higher TLB 170, the writing of this write data WD to the higher TLB 170 is prohibited. Therefore, it is possible to prevent the double writing of the address translation data to the higher TLB 170. Consequently, it is possible to prevent a multi-hit of address translation in the higher address translator 100b.

Further, according to the above embodiment, as access is made to the higher TLB 170 based on the FIFO (first-in and first-out) control, it is possible to simplify the structure relating to the access control.

While an embodiment of the present invention has been explained above with reference to the drawings, detailed structure examples are not limited to this one embodiment. Any design alteration within a range not deviating from the gist of the present invention is included in the present invention.

For example, while the prevention of a double writing of the write data WD based on a result of the comparison of LOC_NUM (position data) has been explained in this embodiment, it is also possible to carry out the comparison using a part of the write data WD or the lower TLB data, in place of LOC_NUM (position data).

As explained above, according to the present invention, record information relating to the writing of address translation data into the higher address translation buffer is referred to. When address translation data that is the same as the address translation data has already been written in the higher address translation buffer, the writing of the address translation data to the higher address translation buffer is prohibited. Therefore, there is an effect that it is possible to prevent a double writing of address translation data to the higher address translation buffer, and it is possible to prevent a multi-hit of address translation in the higher layer.

Further, according to the present invention, information of positions at which address translation data that have been written in the higher address translation buffer in the past is held as the record information. A storage address of the address translation data is compared with the record information. When the storage address and the record information coincide with each other, the writing of address translation data into the higher address translation buffer is prohibited by regarding that address translation data that is the same as the address translation data has already been written in the higher address translation buffer. Therefore, there is an effect that it is possible to prevent a double writing of address translation data to the higher address translation buffer, and it is possible to prevent a multi-hit of address translation in the higher layer.

Further, according to the present invention, address translation data that have been written in the higher address translation buffer in the past is held as the record information. The address translation data is compared with the record information. When the address translation data and the record information coincide with each other, the writing of address translation data into the higher address translation buffer is prohibited by regarding that address translation data that is the same as the address translation data has already been written in the higher address translation buffer. Therefore, there is an effect that it is possible to prevent a double writing of address translation data to the higher address translation buffer, and it is possible to prevent a multi-hit of address translation in the higher layer.

Further, according to the present invention, a part of address translation data that have been written in the higher address translation buffer in the past is held as the record information. The part of the address translation data is compared with the record information. When the part of the address translation data and the record information coincide with each other, the writing of address translation data into the higher address translation buffer is prohibited by regarding that address translation data that is the same as the address translation data has already been written in the higher address translation buffer. Therefore, there is an effect that it is possible to prevent a double writing of address translation data to the higher address translation buffer, and it is possible to prevent a multi-hit of address translation in the higher layer.

Further, according to the present invention, access is made to the higher address translation buffer based on the FIFO control. Therefore, there is an effect that it is possible to simplify a structure relating to the access control.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus comprising:
   a higher address translation buffer that stores address translation data for translating a virtual address into a physical address;
   a higher control unit that translates a virtual address into a physical address based on the address translation data in the higher address translation buffer according to an access, and requests a latter stage to control the address translation when it is not possible to carry out the translation;
   a lower control unit that translates the virtual address into the physical address according to the request for address translation from the higher control unit;
   a write control unit that writes the address translation data that has been used for address translation into the higher address translation buffer; and
   a write prohibiting unit that refers to record information relating to the writing of address translation data into the higher address translation buffer, and prohibits the writing of the address translation data into the higher address translation buffer when address translation data that is the same as the address translation data has already been written in the higher address translation buffer.

2. The apparatus according to claim 1, wherein the write prohibiting unit
   holds information of positions at which address translation data that have been written in the higher address translation buffer in the past is stored, as the record information,
   compares a storage address of the address translation data that has been used for the translation in the lower control unit with the record information, and
   prohibits the writing of address translation data into the higher address translation buffer by regarding that address translation data that is the same as the address translation data has already been written in the higher address translation buffer, when the storage address and the record information coincide with each other.

3. The apparatus according to claim 1, wherein the write prohibiting unit
   holds address translation data that have been written in the higher address translation buffer in the past, as the record information,
   compares the address translation data that has been used for the translation in the lower control unit with the record information, and
   prohibits the writing of address translation data into the higher address translation buffer by regarding that address translation data that is the same as the address translation data has already been written in the higher address translation buffer, when the address translation data and the record information coincide with each other.

4. The apparatus according to claim 1, wherein the write prohibiting unit
   holds a part of address translation data that have been written in the higher address translation buffer in the past, as the record information,
   compares the part of address translation data that has been used for the translation in the lower control unit with the record information, and
   prohibits the writing of address translation data into the higher address translation buffer by regarding that address translation data that is the same as the address translation data has already been written in the higher address translation buffer, when the part of the address translation data and the record information coincide with each other.

5. The apparatus according to claim 1, wherein the higher control unit accesses the higher address translation buffer based on the first-in-first-out control.

6. A method comprising:
   a higher control step of translating a virtual address into a physical address based address translation data stored in a higher address translation buffer, the address translation data being data for translating a virtual address into a physical address, according to an access, and requesting a latter stage to control the address translation when it is not possible to carry out the translation;
   a lower control step of translating the virtual address into the physical address according to the request for address translation at the higher control step;

a write control step of writing the address translation data that has been used for address translation into the higher address translation buffer; and a write prohibiting step of referring to record information relating to the writing of address translation data into the higher address translation buffer, and prohibiting the writing of the address translation data to the higher address translation buffer when address translation data that is the same as the address translation data has already been written in the higher address translation buffer.

7. The method according to claim 6, wherein the write prohibiting step further comprising:

holding information of positions at which address translation data that have been written in the higher address translation buffer in the past is stored, as the record information;

comparing a storage address of the address translation data that has been used for the translation at the lower control step with the record information; and prohibiting the writing of address translation data into the higher address translation buffer by regarding that address translation data that is the same as the address translation data has already been written in the higher address translation buffer when the storage address and the record information coincide with each other.

8. The method according to claim 6, wherein the write prohibiting step further comprising:

holding address translation data that have been written in the higher address translation buffer in the past, as the record information;

comparing the address translation data that has been used for the translation at the lower control step with the record information; and prohibiting the writing of address translation data into the higher address translation buffer by regarding that address translation data that is the same as the address translation data has already been written in the higher address translation buffer when the address translation data and the record information coincide with each other.

9. The method according to claim 6, wherein the write prohibiting step further comprising:

holding a part of address translation data that have been written in the higher address translation buffer in the past, as the record information, comparing the part of address translation data that has been used for the translation at the lower control step with the record information; and prohibiting the writing of address translation data into the higher address translation buffer by regarding that address translation data that is the same as the address translation data has already been written in the higher address translation buffer when the part of the address translation data and the record information coincide with each other.

10. The method according to claim 6, wherein in the higher control step, the first-in-first-out control is used when accessing the higher address translation buffer.

11. The method according to claim 6, wherein the record information is held for a preset predetermined period.

* * * * *